United States Patent
Yoon

(10) Patent No.: US 8,265,714 B2
(45) Date of Patent: Sep. 11, 2012

(54) METHOD AND APPARATUS FOR SUPPORTING ENERGY SAVING FUNCTION IN COMMUNICATION SYSTEM

(75) Inventor: Sung-Hoon Yoon, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 13/004,347

(22) Filed: Jan. 11, 2011

(65) Prior Publication Data

US 2011/0171930 A1    Jul. 14, 2011

(30) Foreign Application Priority Data

Jan. 13, 2010    (KR) .................. 10-2010-0003061

(51) Int. Cl.
    *H04B 1/38* (2006.01)
    *H04M 1/00* (2006.01)
(52) U.S. Cl. ...................... 455/574; 455/550
(58) Field of Classification Search .............. 455/432.3, 455/291, 550.1, 522, 574, 418, 442, 573, 455/507, 405, 422.1; 709/223; 370/331, 321
See application file for complete search history.

(56) References Cited

U.S. PATENT DOCUMENTS

| | | | |
|---|---|---|---|
| 7,822,417 B1 * | 10/2010 | Eslambolchi et al. | ..... 455/432.3 |
| 2003/0217133 A1 * | 11/2003 | Ostrup et al. | .................. 709/223 |
| 2005/0164667 A1 * | 7/2005 | Pan et al. | ...................... 455/291 |
| 2011/0077059 A1 | 3/2011 | Kim et al. | |

FOREIGN PATENT DOCUMENTS

KR    10-2011-0034774 A    4/2011

* cited by examiner

*Primary Examiner* — Kiet Doan
(74) *Attorney, Agent, or Firm* — Jefferson IP Law, LLP

(57) ABSTRACT

A method and system for supporting an energy saving function in a communication system are provided. An evolved Node B (eNB) Element Management System (EMS) receives usage statistical data from an eNB and compares the usage statistical data with a threshold value. The eNB EMS determines whether to turn on or off power sources of Power Amplifier (PA) units connected to antennas corresponding to sectors included in a serving cell of the eNB according to the compared result, and transmits, to the eNB, a command message directing the eNB to turn on or off power sources of corresponding PA units according to the determined result.

16 Claims, 5 Drawing Sheets

```
powerAmplifierSONTable OBJECT-TYPE
    SYNTAX  SEQUENCE OF powerAmplifierSONEntry
    MAX-ACCESS    not-accessible
    STATUS  current
    DESCRIPTION
        "MANAGE configuration of PowerAmplifier ON/OFF "
    ::=   { powerAmplifierSONObject 1 } powerAmplifierSONEntry  OBJECT-TYPE
    SYNTAX  powerAmplifierSONEntry
    MAX-ACCESS    not-accessible
    STATUS  current
    DESCRIPTION
        "MANAGE configuration of PowerAmplifier ON/OFF "
    INDEX  {
        sectorId, ampId
        }
    ::=   { powerAmplifierSONTable 1 }

SSectorEquipmentConfEntry    ::= SEQUENCE  {
    ssectorId Integer32,
    ampId Integer32,
ampOnOffFlag  ampFlagType
        }

EampFlagType ::= TEXTUAL-CONVENTION
  STATUS    current
  DESCRIPTION
    ""
  SYNTAX INTEGER{
    e_AMP_CONF_TYPE_ON(0),
    e_AMP_CONF_TYPE_OFF(1),
  }
```

FIG.3

METHOD AND APPARATUS FOR SUPPORTING ENERGY SAVING FUNCTION IN COMMUNICATION SYSTEM

PRIORITY

This application claims the benefit under 35 U.S.C. §119(a) of a Korean patent application filed in the Korean Intellectual Property Office on Jan. 13, 2010 and assigned Serial No. 10-2010-0003061, the entire disclosure of which is hereby incorporated by reference.

BACKGROUND OF THE INVENTION

1. Field of the Invention

The present invention relates to a method and apparatus for controlling a communications system. More particularly, the present invention relates to a method and apparatus for supporting an energy saving function in a communication system.

2. Description of the Related Art

A Long Term Evolution (LTE) communication system, which is one of several communication systems, supports an Energy Saving (ES) function for reducing the power consumption of a base station as a Self Organizing Network (SON) function. The ES function decreases system operating costs of service providers by reducing unnecessary power consumed in a base station. The ES function is regarded as a green information technology by mobile communication companies and is a differentiated function of an LTE evolved Node B (eNB). To support the ES function, main eNB vendors suggest to service providers that a power source should be supplied to associated eNBs using solar heat or wind power as an SON function. However, the existing LTE standard does not propose details about a signaling scheme for supporting the ES function. Accordingly, a detailed signaling scheme for supporting the ES function in an LTE communication system is needed.

SUMMARY OF THE INVENTION

An aspect of the present invention is to address at least the above-mentioned problems and/or disadvantages and to provide at least the advantages described below. Accordingly, an aspect of the present invention is to provide a signaling method between an evolved Node B (eNB) and an eNB Element Management System (EMS) in a communication system, which can reduce the transmission power of the eNB at a time period in which the amount of communication traffic is relatively small.

Another aspect of the present invention is to provide a method for turning off power sources of some power amplifier units connected to eNB antennas at a time period in which the amount of communication traffic is relatively small and turning on the power sources of the turned-off power amplifier units when the amount of communication traffic becomes a normal level, in a communication system.

In accordance with an aspect of the present invention, a method for supporting an energy saving function in a communication system is provided. The method includes receiving, by an eNB EMS, usage statistical data from an eNB and comparing the usage statistical data with a threshold value, determining, by the eNB EMS, whether to turn on or off power sources of Power Amplifier (PA) units connected to antennas corresponding to sectors included in a serving cell of the eNB according to the compared result, and transmitting, by the eNB EMS to the eNB, a command message directing the eNB to turn on or off power sources of corresponding PA units according to the determined result.

In accordance with another aspect of the present invention, a Long Term Evolution (LTE) mobile communication system for supporting an energy saving function is provided. The system includes an eNB for collecting usage statistical data, and an eNB EMS for receiving the usage statistical data from the eNB, for comparing the usage statistical data with a threshold value, for determining whether to turn on or off power sources of Power Amplifier (PA) units connected to antennas corresponding to sectors included in a serving cell of the eNB according to the compared result, and for transmitting, to the eNB, a command message directing the eNB to turn on or off power sources of corresponding PA units according to the determined result.

In accordance with another aspect of the present invention, a mobile station is provided. The mobile station includes a plurality of antennas, a plurality of PA units, each of the plurality of PA units connected to a transmission side of a corresponding one of the plurality of antennas, and a controller for collecting usage statistical data about the plurality of antennas, for controlling the antennas to transmit the usage statistical data to an EMS, for receiving a command message from the EMS based on the usage statistical data, and for controlling the supply of power to at least one of the PA units based on the received command message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 is a diagram illustrating a structure of an ON/OFF command message according to an exemplary embodiment of the present invention;

Throughout the drawings, the same drawing reference numerals will be understood to refer to the same elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a signaling method between an evolved Node B (eNB) and an eNB Element Management System (EMS) in a communication system, which detects a time period in which the amount of communication traffic is relatively small and can save the transmission power of the eNB. An example given here is a Long Term Evolution (LTE) communication system. However, it will be understood that exemplary embodiments of the present invention are not limited to the LTE communication system, and may be applied to other communication systems.

More specifically, exemplary embodiments of the present invention provide a signaling method of an interface between the eNB and the eNB EMS, based on an Integrated Reference Point (IRP) manager and an IRP agent model which are proposed in the LTE SA5 standard.

Figure 1:
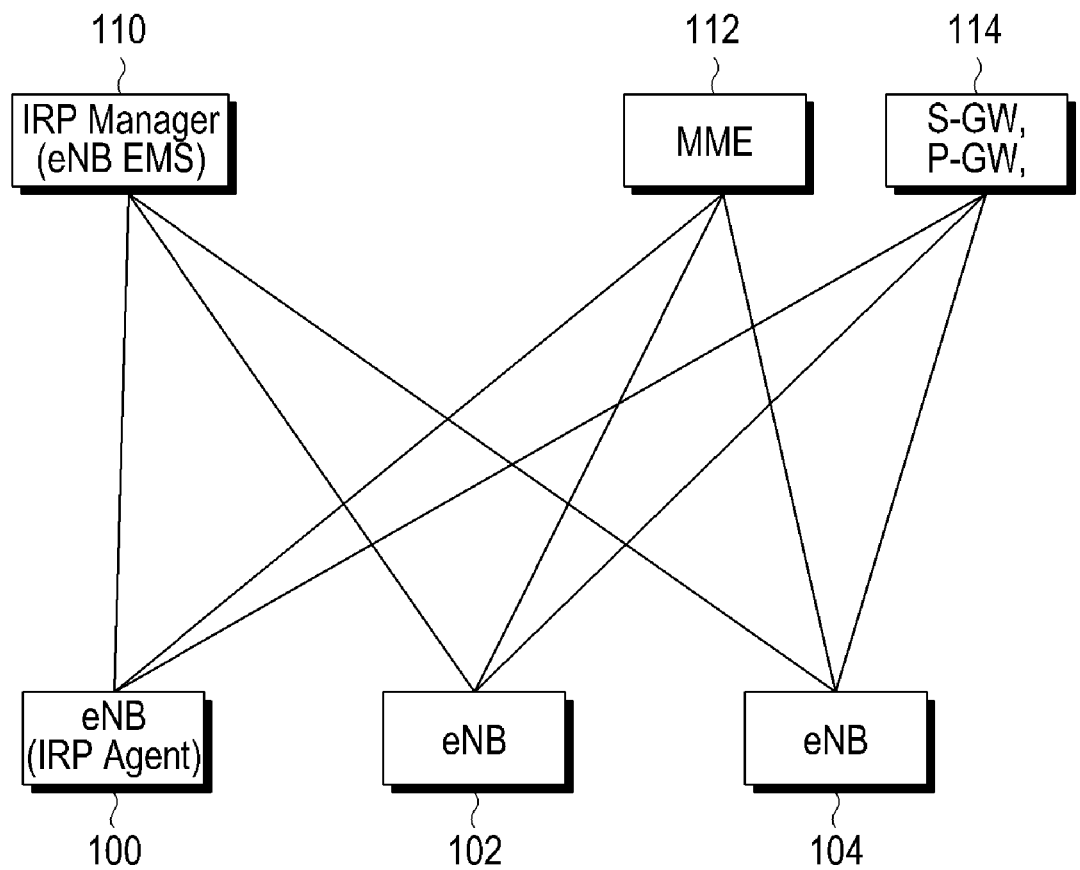
FIG. 1 is a diagram illustrating a configuration of a Long Term Evolution (LTE) communication system according to an exemplary embodiment of the present invention.

FIG. 1 is a diagram illustrating a configuration of a communication system according to an exemplary embodiment of the present invention.

Referring to FIG. 1, the LTE communication system includes eNBs 100, 102, and 104 corresponding to IRP agents, an eNB EMS 110 corresponding to an IRP manager, a Mobile Management Entity (MME) 112, and a Serving GateWay (S-GW)/Packet Data Network (PDN) GateWay (P-GW) 114. The MME 112 and the S-GW/P-GW 114 will not be described in detail because they are not directly associated with exemplary embodiments of the present invention.

The eNB EMS 110 manages the eNBs 100, 102, and 104. Each of the eNBs 110, 102, and 104 collects its usage statistical data. The usage statistical data includes at least one of the number of currently activated user terminals, the number of currently established calls, and the number of currently used physical resource blocks.

The eNB EMS 110 performs an ES function using the usage statistical data received from the eNBs 100, 102, and 104. The ES function of the eNB EMS according to an exemplary embodiment of the present invention will be described in more detail with reference to FIG. 2.

Figure 2:
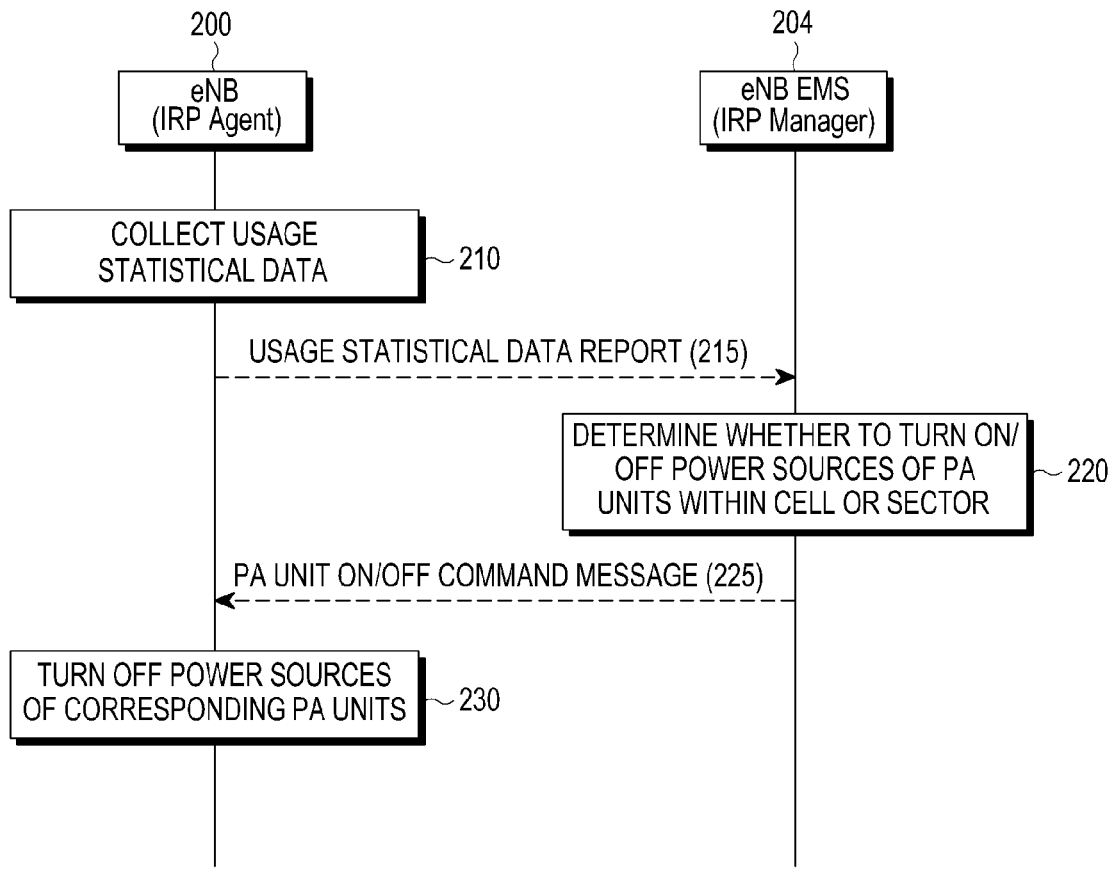
FIG. 2 is a flowchart illustrating an operation for an Energy Saving (ES) function of an evolved Node B (eNB) Element Management System (EMS) according to an exemplary embodiment of the present invention.

FIG. 2 is a flowchart illustrating an operation for an ES function of an eNB EMS according to an exemplary embodiment of the present invention. An example given here is the case where the eNB EMS manages one eNB. However, it will be understood that an exemplary embodiment of the present invention may also be applied to the case where the eNB EMS manages a plurality of eNBs.

Referring to FIG. 2, an eNB 200 collects usage statistical data in step 210. The usage statistical data includes the number of currently activated user terminals among user terminals located within a service area (e.g., a cell) of the eNB 200, the number of currently established calls, the number of currently used physical resource blocks, and the like.

The eNB 200 converts the collected usage statistical data into a format of an IRP configuration form and transmits the converted data to an eNB EMS 204 in step 215. The format of the IRP configuration form includes Simple Network Management Protocol (SNMP), eXtensible Markup Language (XML), Service Oriented Application Protocol (SOAP), etc.

The eNB EMS 204 determines, in step 220, using the received usage statistical data whether to turn on or off power sources of Power Amplifier (PA) units connected to antennas of the eNB 200 towards a service area (that is, a cell) of the eNB 200 or sectors constituting the cell. The eNB EMS 204 compares a predetermined threshold value with the usage statistical data. For example, the eNB EMS 204 compares the number of currently activated user terminals among user terminals located within a service area of the eNB 200, the number of currently established calls, or the number of physical resource blocks with a corresponding threshold value. If the number of currently activated user terminals, the number of currently established calls, or the number of physical resource blocks is less than the corresponding threshold value, the eNB EMS 204 determines that power sources of PA units connected to antennas of the eNB 200 towards the cell should be turned off. If the number of currently activated user terminals, the number of currently established calls, or the number of physical resource blocks is equal to or greater than a corresponding threshold value, the eNB EMS 204 determines that power sources of turned-off PA units among PA units connected to antennas of the eNB 200 towards the cell should be turned on. If there are no turned-off PA units, the eNB EMS 204 maintains the state of power sources of the PA units connected to antennas of the eNB 200.

The eNB EMS 204 transmits, to the eNB 200, a PA unit ON/OFF command message representing the ON/OFF command of power sources of PA units connected to antennas of the eNB 200 in step 225. The eNB 200 receives the PA unit ON/OFF command message and turns on or off power sources of corresponding PA units at the direction of the PA unit ON/OFF command message in step 230.

The eNB 200 may collect usage statistical data at a predetermined time period and may transmit the usage statistical data to the eNB EMS 204. The eNB EMS 204 may compare a threshold value according to the predetermined time period with the usage statistical data, and may determine whether to turn on or off power sources of PA units connected to antennas of the eNB 200 according to the compared result.

FIG. 3 is a diagram illustrating an example of a structure of an ON/OFF command message according to an exemplary embodiment of the present invention. An example given here is the case where the eNB EMS 204 receives usage statistical data of an SNMP format from the eNB 200. However, it will be understood that an exemplary embodiment of the present invention may also be applied to a different format of usage statistical data.

Referring to FIG. 3, upon receiving usage statistical data of the SNMP format, the eNB EMS 204 compares the usage statistical data of the SNMP format with a predetermined threshold value. If the usage statistical data of the SNMP format is less than the threshold value, the eNB EMS 204 generates an SNMP-based PA unit ON/OFF command message and transmits the ON/OFF command message to the eNB 200. The SNMP-based PA unit ON/OFF command message includes a specific sector identifier or a specific PA unit identifier, and an ON/OFF command for a power source of a specific sector or a specific PA unit corresponding respectively to the specific sector identifier or the specific PA unit identifier. An example of an operation for turning off power sources of antennas of an eNB will be described with reference to FIGS. 4A and 4B.

Figure 4A:
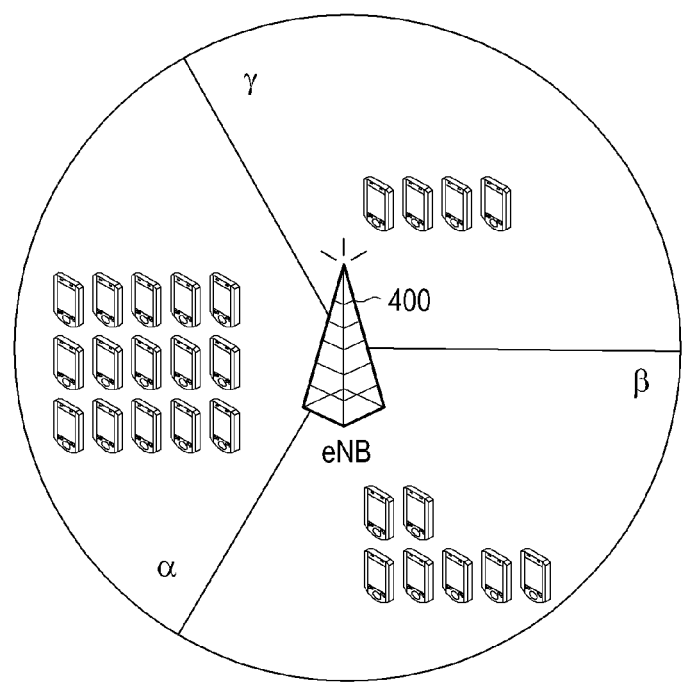
FIG. 4A is a diagram illustrating usage statistical data collected by an eNB according to an exemplary embodiment of the present invention.

FIG. 4A is a diagram illustrating an example of usage statistical data collected by an eNB according to an exemplary embodiment of the present invention.

Referring to FIG. 4A, an eNB 400 having a service area (or cell) consisting of 3 sectors α, β, and γ is shown. The eNB 400 receives usage statistical data per sector and transmits the statistical data to an eNB EMS (not shown). Although it is assumed in this example that the usage statistical data is the number of user terminals which are using physical resource blocks of a corresponding sector, the usage statistical data may include other information.

The eNB EMS compares the number of user terminals which are using physical resource blocks of each sector with a predetermined threshold value. It is assumed in this example that the threshold value is 8. As a compared result, the eNB EMS confirms sectors in which the number of user terminals which are using physical resource blocks of each sector is less than the threshold value. In the example shown, the sectors β and γ have fewer than the threshold number of physical resource blocks.

Figure 4B:
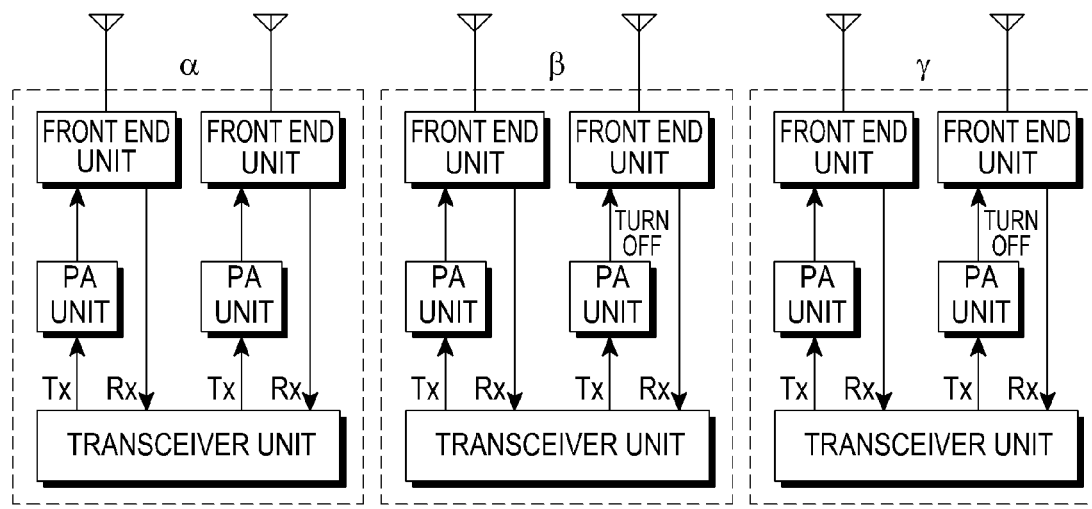
FIG. 4B is a diagram of a structure of antennas of an eNB according to an exemplary embodiment of the present invention.

FIG. 4B is a diagram of a structure of antennas of an eNB according to an exemplary embodiment of the present invention.

Referring to FIG. 4B, an eNB 400 includes two antennas per each of sectors α, β and γ constituting the cell. The antennas of each sector are connected to a Radio Frequency (RF) unit. The RF unit is connected to the antennas of the respective sectors α, β and γ and includes front end units, each divided into transmitting/receiving ends. The transmitting end is connected to a transceiver unit via a PA unit. The receiving end is directly connected to the transceiver unit. In the example given here, each of antennas per sector is used as the transmitting and receiving ends. However, the present invention may be applied to other cases.

Since the amount of communication traffic is relatively small in the sectors β and γ in which the number of user terminals using physical resource blocks is less than the threshold value, the eNB EMS transmits a PA unit ON/OFF command message to the eNB 400 directing the eNB 400 to turn off a power source of a PA unit connected to one of transmission antennas of each of the sectors β and γ. This example shows the case of transmitting the PA unit ON/OFF command message for turning off one of the two PA units per sector. However, if a plurality of antennas is included in a sector, the number of turned-off PA units may be determined based on system circumstances. The eNB 400 receiving the command message turns off power sources of PA units of antennas towards sectors corresponding to a sector identifier included in the command message or power sources of PA units corresponding to a PA identifier included in the command message.

Figure 5:
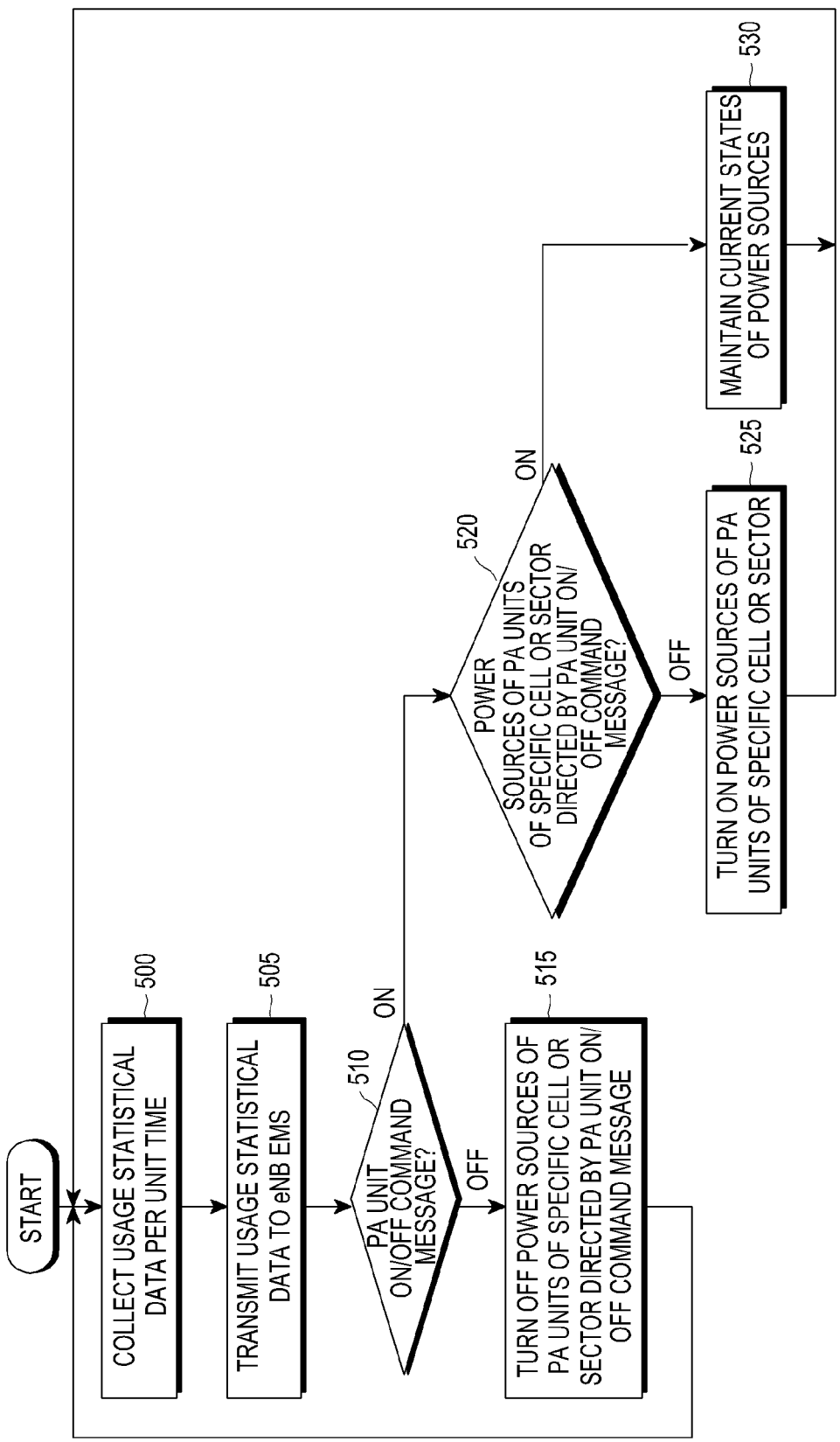
FIG. 5 is a flowchart illustrating an operation for performing an ES function by an eNB according to an exemplary embodiment of the present invention.

FIG. 5 is a flowchart illustrating an operation for performing an ES function by an eNB according to an exemplary embodiment of the present invention.

Referring to FIG. 5, the eNB collects usage statistical data per unit time in step 500. The unit time may be arbitrarily determined by a service provider. The usage statistical data includes at least one of the number of currently activated user terminals among user terminals located within a service area (or a cell) of the eNB, the number of currently established calls, and the number of currently used physical resource blocks.

The eNB converts the collected usage statistical data into a format of an IRP configuration form and transmits the converted data to the eNB EMS in step 505. The format of an IRP configuration form includes SNMP, XML, SOAP, etc.

The eNB receives, from the eNB EMS, and confirms a PA unit ON/OFF command message, which is determined based on the collected usage statistical data and represents the ON/OFF command of power sources of PA units connected to antennas of the eNB 200 towards sectors constituting a service area (e.g., a cell) of the eNB 200, in step 510. If the PA unit ON/OFF command message denotes 'OFF', the eNB turns off power sources of PA units of antennas towards sectors corresponding to a specific sector identifier included in the PA unit ON/OFF command message or power sources of PA units corresponding to a PA unit identifier included in the PA unit ON/OFF command message in step 515 and returns to step 500.

If the PA unit ON/OFF command message denotes 'ON', the eNB determines in step 520 whether power sources of PA units of antennas towards sectors corresponding to a specific sector identifier included in the PA unit ON/OFF command message or power sources of PA units corresponding to a PA unit identifier included in the PA unit ON/OFF command message are on or off states. If they are in off states, the eNB turns on power sources of corresponding PA units in step 525 and returns to step 500. If they are in on states, the eNB maintains the current states of power sources of corresponding PA units in step 530 and returns to step 500.

According to exemplary embodiments of the present invention, if an eNB collects and transmits usage statistical data according to a predetermined time period to an eNB EMS, the eNB EMS compares the usage statistical data with a predetermined threshold according to the time period, determines whether to turn on or off power sources of PA units connected to transmission antennas of the eNB according to the compared result, and informs the eNB of the determined result. Through such an operation, only some PA units of the eNB are turned on at a time period of a relatively small amount of traffic, thereby reducing the power consumption of the eNB.

While the invention has been shown and described with reference to certain exemplary embodiments thereof, it will be understood by those skilled in the art that various changes in form and details may be made therein without departing from the scope and spirit of the invention as defined by the appended claims and their equivalents.

What is claimed is:

1. A method for supporting an energy saving function in a communication system, the method comprising:
   receiving, by an evolved Node B (eNB) Element Management System (EMS), usage statistical data from an eNB and comparing the usage statistical data with a threshold value;
   determining, by the eNB EMS, whether to turn on or off power sources of Power Amplifier (PA) units connected to antennas corresponding to sectors included in a serving cell of the eNB according to the compared result; and
   transmitting, by the eNB EMS to the eNB, a command message directing the eNB to turn on or off power sources of corresponding PA units according to the determined result.

2. The method of claim 1, further comprising:
   turning on or off, by the eNB, power sources of PA units corresponding to at least one of a sector identifier and a PA unit identifier included in the command message according to a power source on/off command included in the command message.

3. The method of claim 1, wherein the usage statistical data comprises at least one of a number of currently activated user terminals among user terminals located within the serving cell, a number of currently established calls, and a number of currently used physical resource blocks.

4. The method of claim 3, wherein the comparing of the usage statistical data with the threshold value comprises:
receiving, by the eNB EMS, the number of physical resource blocks at a predetermined time period from the eNB; and
comparing, by the eNB EMS, a predetermined threshold value at the time period with the number of the physical resource blocks at the time period.

5. The method of claim 4, further comprising:
determining that power sources of a part of PA units connected to antennas corresponding to sectors included in the serving cell of the eNB should be turned off, when the number of the physical resource blocks at the time period is less than the threshold value at the time period.

6. The method of claim 4, further comprising:
determining that power sources of turned-off PA units among PA units connected to antennas corresponding to sectors included in the serving cell of the eNB should be turned on, when the number of the physical resource blocks at the time period is equal to greater than the threshold value at the time period.

7. The method of claim 1, wherein the usage statistical data includes a format of an Integrated Reference Point (IRP) configuration form.

8. The method of claim 7, wherein the format of the IRP configuration form comprises at least one of Simple Network Management Protocol (SNMP), eXtensible Markup Language (XML), and Service Oriented Application Protocol (SOAP).

9. A Long Term Evolution (LTE) mobile communication system for supporting an energy saving function, the system comprising:
an evolved Node B (eNB) for collecting usage statistical data; and
an eNB Element Management System (EMS) for receiving the usage statistical data from the eNB, for comparing the usage statistical data with a threshold value, for determining whether to turn on or off power sources of Power Amplifier (PA) units connected to antennas corresponding to sectors included in a serving cell of the eNB according to the compared result, and for transmitting, to the eNB, a command message directing the eNB to turn on or off power sources of corresponding PA units according to the determined result.

10. The LTE mobile communication system of claim 9, wherein the eNB turns on or off power sources of PA units corresponding to at least one of a sector identifier and a PA unit identifier included in the command message according to a power source on/off command included in the command message.

11. The LTE mobile communication system of claim 9, wherein the usage statistical data includes at least one of a number of currently activated user terminals among user terminals located within the serving cell, a number of currently established calls, and a number of currently used physical resource blocks.

12. The LTE mobile communication system method of claim 11, wherein the eNB EMS receives the number of physical resource blocks at a predetermined time period from the eNB, and compares a predetermined threshold value at the time period with the number of the physical resource blocks at the time period.

13. The LTE mobile communication system of claim 12, wherein the eNB EMS determines that power sources of at least one PA unit connected to antennas corresponding to sectors included in the serving cell of the eNB should be turned off, when the number of the physical resource blocks at the time period is less than the threshold value at the time period.

14. The LTE mobile communication system of claim 12, wherein the eNB EMS determines that power sources of turned-off PA units among PA units connected to antennas corresponding to sectors included in the serving cell of the eNB should be turned on, when the number of the physical resource blocks at the time period is equal to greater than the threshold value at the time period.

15. The LTE mobile communication system of claim 9, wherein the usage statistical data comprises a format of an Integrated Reference Point (IRP) configuration form.

16. The LTE mobile communication system of claim 15, wherein the format of the IRP configuration form comprises at least one of Simple Network Management Protocol (SNMP), eXtensible Markup Language (XML), and Service Oriented Application Protocol (SOAP).

* * * * *